(12) United States Patent
Fucke

(10) Patent No.: US 9,815,567 B2
(45) Date of Patent: Nov. 14, 2017

(54) AIRCRAFT SPEED GUIDANCE DISPLAY

(75) Inventor: Lars Fucke, Madrid (ES)

(73) Assignee: The Boeing Company, Chicago, IL (US)

( * ) Notice: Subject to any disclaimer, the term of this patent is extended or adjusted under 35 U.S.C. 154(b) by 282 days.

(21) Appl. No.: 13/614,383

(22) Filed: Sep. 13, 2012

(65) Prior Publication Data

US 2013/0253738 A1    Sep. 26, 2013

(30) Foreign Application Priority Data

Sep. 21, 2011 (EP) .................................... 11380074

(51) Int. Cl.
*B64D 45/00* (2006.01)
*G01C 23/00* (2006.01)
*G08G 5/00* (2006.01)

(52) U.S. Cl.
CPC ............. *B64D 45/00* (2013.01); *G01C 23/00* (2013.01); *G08G 5/0021* (2013.01)

(58) Field of Classification Search
CPC .......... B64D 45/00; G01C 23/00; G06G 7/70; G64D 45/00; G08G 5/00; G08G 5/0021; G05D 1/00
USPC ....................................................... 701/1, 14
See application file for complete search history.

(56) References Cited

U.S. PATENT DOCUMENTS 3,612,837 A * 10/1971 Brandau ............................ 701/3
4,536,843 A *  8/1985 Lambregts ........................ 701/3
5,459,666 A    10/1995 Casper et al.
5,833,177 A * 11/1998 Gast ............................... 244/195
6,492,934 B1 * 12/2002 Hwang et al. .................. 342/33
6,690,299 B1 *  2/2004 Suiter ........................... 340/973

(Continued)

FOREIGN PATENT DOCUMENTS

CN    101198997 A    6/2008
GB      1061386       3/1967
JP    2003130677 A    5/2003

OTHER PUBLICATIONS

EP Patent Office, EP Search Report for EP Application No. 11380074.2-1236 dated Feb. 13, 2012.

(Continued)

*Primary Examiner* — Yonel Beaulieu
(74) *Attorney, Agent, or Firm* — Charles L. Moore; Moore & Van Allen PLLC

(57) ABSTRACT

The invention relates to systems and methods for displaying flight information representative of a deviation from a specified four-dimensional flight path. Particularly, but not exclusively, the invention relates to a cockpit display for enabling pilots to arrive at a particular location at a particular time and to achieve the necessary changes to aircraft speed to achieve a preferred ground speed.

There is described a system and a method that displays flight information relating to a predetermined flight path. The predetermined flight path specifies locations and corresponding scheduled times. A current location of an aircraft along the predetermined flight path is monitored. A current time at which the aircraft is at the current location is determined. A scheduled time for the aircraft to be at the current location is provided. A time deviation between the current time and the scheduled time is calculated. The time deviation is displayed.

22 Claims, 3 Drawing Sheets

(56) References Cited

U.S. PATENT DOCUMENTS

| | | | |
|---|---|---|---|
| 6,933,859 B2* | 8/2005 | Hurt | G01D 7/02 340/945 |
| 2003/0132860 A1* | 7/2003 | Feyereisen | G01C 23/00 340/973 |
| 2004/0181318 A1* | 9/2004 | Redmond | G01C 5/005 701/9 |
| 2006/0250280 A1* | 11/2006 | Chen | G01C 23/00 340/974 |
| 2007/0010921 A1* | 1/2007 | Ishihara et al. | 701/16 |
| 2007/0100538 A1 | 5/2007 | Wise et al. | |
| 2007/0145183 A1* | 6/2007 | Baudry | 244/76 R |
| 2009/0140885 A1* | 6/2009 | Rogers et al. | 340/977 |
| 2010/0114406 A1 | 5/2010 | Dejonge et al. | |
| 2013/0060466 A1* | 3/2013 | Gurusamy | G01C 23/005 701/465 |
| 2013/0253738 A1* | 9/2013 | Fucke | G01C 23/00 701/14 |
| 2016/0349759 A1* | 12/2016 | Shue | G05D 1/0653 |

OTHER PUBLICATIONS

Russian Federal Institute of Industrial Property; Office Action for Russian Patent Application No. 2012140222/11 (064958) dated Aug. 23, 2016, 6 Pages.
Japanese Patent Office; Office Action for Japanese Patent Application No. 2012-207671 dated May 10, 2016, 2 Pages.
Chinese Patent Office; Office Action for Chinese Patent Application No. 201210349676.2 dated Jul. 1, 2016, 17 Pages.
Chinese Patent Office; Office Action for Chinese Patent Application No. 2012103496762 dated Mar. 7, 2017, 4 Pages.

* cited by examiner

AIRCRAFT SPEED GUIDANCE DISPLAY

CROSS-REFERENCE TO RELATED APPLICATIONS

The present application claims benefit of priority to European Application No. EP11380074.2 filed on Sep. 21, 2011, the contents of which are hereby incorporated by reference herein in its entirety.

BACKGROUND

The present invention relates to systems and methods for displaying flight information representative of a deviation from a specified four-dimensional flight path. Particularly, but not exclusively, the invention relates to a cockpit display for enabling pilots to arrive at a particular location at a particular time and to achieve the necessary changes to aircraft speed to achieve a preferred ground speed.

Flight paths are conventionally calculated in three dimensions, i.e. longitude, latitude and altitude. Future air traffic control systems are expected to specify a further dimension to flight paths, namely time. In other words, such air traffic control systems will not only provide a path that an aircraft must follow, but will also specify the time at which an aircraft must be at each position along the path. This will allow air traffic control to relax the requirement for separation between aircraft and thereby allow more efficient use of airspace.

Conventional cockpit displays display only absolute airspeed, a target for absolute airspeed, and an airspeed trend arrow. The latter indicates the aircraft's predicted speed after a fixed time period (typically, six to ten seconds) in dependence upon the current rate of change of airspeed. Such cockpit displays are suited to the presently used air traffic control systems, which may specify absolute speed commands in the form of target airspeeds. However, they do not provide the flight crew with information that is directly relevant to the task of accurately following a four-dimensional flight path.

Airspeed measurements are not directly comparable with ground speed values, since airspeed is measured relative to the body of air that the aircraft is travelling through. This body of air can itself be moving relative to the ground. The movement of the body of air is characterised by wind speed and wind direction, each of which can vary over time. Therefore, ground speed is equivalent to the magnitude of the sum of the vector defining the aircraft's airspeed and the vector defining the wind speed. Typically, the vertical direction is not considered in this comparison since it has a negligible effect. In view of the time varying nature of airspeed relative to ground speed, the display of airspeed is not appropriate for flight crews trying to accurately follow a four-dimensional flight path.

SUMMARY

According to an embodiment, a method displays flight information relating to a predetermined flight path. The predetermined flight path specifies locations and corresponding scheduled times. The method includes monitoring a current location of an aircraft along the predetermined flight path. The method includes determining a current time at which the aircraft is at the current location. The method includes providing a scheduled time for the aircraft to be at the current location. The method includes calculating a time deviation between the current time and the scheduled time. The method includes displaying the time deviation.

According to a further embodiment, a system for displaying flight information includes a flight path storage memory arranged to store data relating to a predetermined flight path that specifies locations along the flight path and corresponding scheduled times. The system includes a location determination unit arranged to output location data defining a current location of an aircraft along the predetermined flight path. The system includes a timer unit arranged to output time data defining a current time at which the aircraft is at the current location. The system includes a processor arranged to receive the location data and the time data, to determine a scheduled time from the scheduled times stored in the flight path memory corresponding to the current location, and to calculate a time deviation between the current time and the scheduled time. The system includes a display arranged to display the time deviation.

According to another embodiment, a layout is disclosed for presenting flight information on a display including: a time deviation scale having an origin and portions extending either side of the origin to represent positive and negative values of time deviation; a time deviation indicator to indicate a point along the time deviation scale to thereby indicate a value of time deviation; a ground speed deviation scale having an origin and portions extending either side of the origin to represent positive and negative values of ground speed deviation; and a ground speed deviation indicator to indicate a point along the ground speed deviation scale to thereby indicate a value of ground speed deviation. In one variant, the layout includes wherein the origin of the ground speed deviation scale varies with the indicated value of time deviation.

Advantageously, such methods and systems can display flight information that is directly representative of a deviation from a specified four-dimensional path continuously and in real-time, and can thereby enable a flight crew to easily alter the along-track position of an aircraft to follow the four-dimensional path with greater precision.

Equally, these methods and systems can be applied to a path for which altitude is not specified; i.e. where only latitude, longitude, and time is specified. Accordingly, whilst the embodiments below utilise four-dimensional paths, the invention encompasses the display of time deviation with respect to a path specified in two (lateral) dimensions. In other words, the specified locations along the flight path may be expressed either as three-dimensional positions, or as two-dimensional positions.

BRIEF DESCRIPTION OF THE DRAWINGS

For a better understanding of the invention and to show how the same may be put into effect reference is now made, by way of example only, to the accompanying drawings in which.

DETAILED DESCRIPTION

Disclosed below are illustrations of embodiments of the invention. In one or more of these embodiments, the following are illustrations of one or more elements below. For example, the flight path storage memory can be any form of memory, including both volatile (e.g. RAM) or non-volatile (e.g. a hard disc). Furthermore, the flight path storage memory may store either the entire predetermined flight path, or one or more portion(s) of the flight path. In various embodiments the flight path data may be transmitted to the aircraft in real time for storage in the flight path storage memory, in which case the flight path storage memory can be a simple buffer.

The flight path storage data may include scheduled ground speeds corresponding to locations along the flight path. Alternatively, scheduled ground speeds may be derived from flight path data relating to scheduled times and locations along the flight path. For example, the rate of change of location as dictated by the scheduled times can be calculated and used as scheduled ground speeds.

The location determination unit may be onboard the aircraft or on the ground. In the latter case, the current location would be transmitted to the aircraft using appropriate data communication means.

When the location determination means is located on the aircraft, it may comprise a GPS receiver or some other radio positioning device. If required, the aircraft's altitude may be determined using such a GPS receiver or, more preferably, components such as barometric altimeters, etc. In embodiments in which the location determination means is located on the ground, it may comprise a radar system. The timer unit may be a clock or a receiver of a time signal, for example from a GPS receiver. The processor may be a component of a general purpose computer, or may be an embedded component of a dedicated display device.

Figure 1:
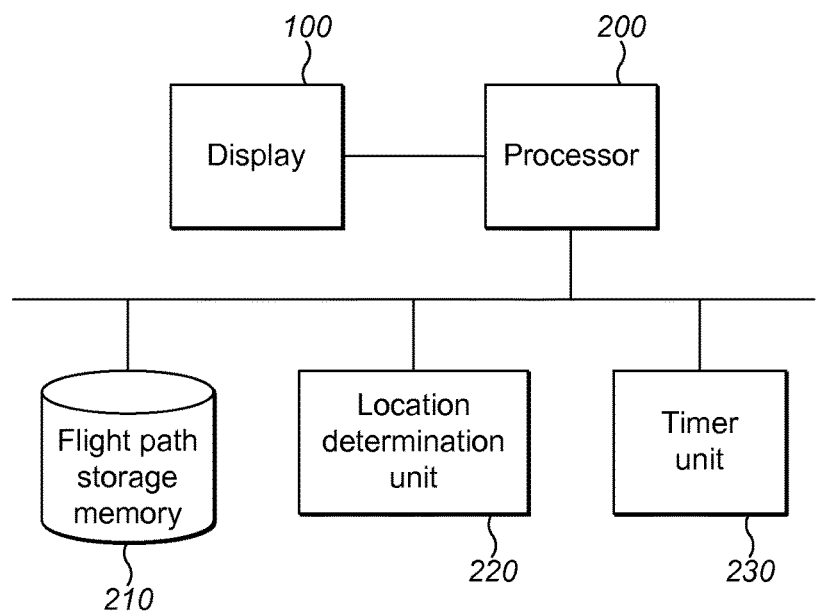
FIG. 1 shows schematic representation of a first embodiment of a system for displaying flight information.
Figure 2:
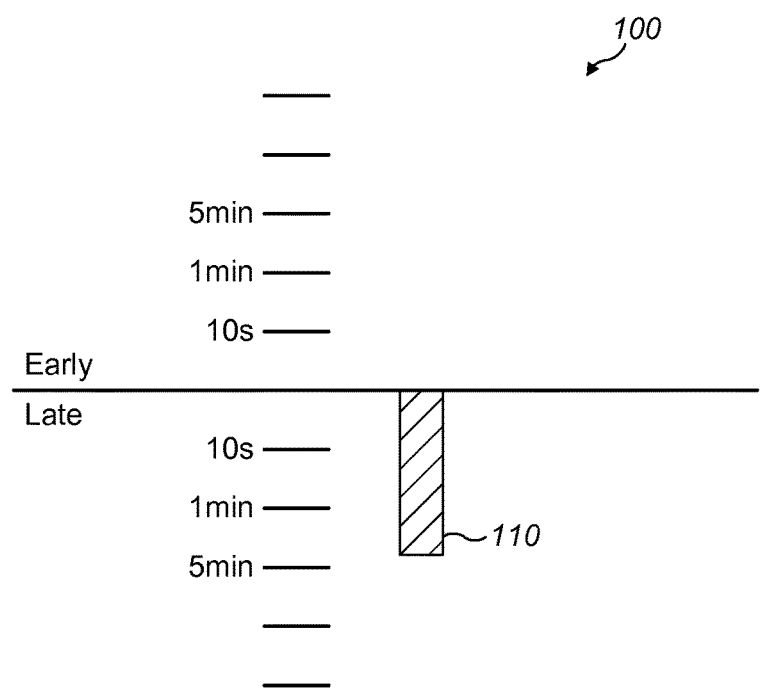
FIG. 2 shows a non-linear display forming part of the first embodiment.

In a first embodiment of the invention, as shown in FIG. 1, an aircraft comprises a display 100; a processor 200; a flight path storage memory 210; a location determination unit 220; and a timer unit 230. As depicted in FIG. 2, the display 100 is arranged to show a time deviation 110. The display 100 may additionally show other data that is conventionally displayed in an aircraft cockpit, such as absolute airspeed.

The flight path storage memory 210 stores flight path data relating to the predetermined flight path to be travelled by the aircraft. Such data may be generated by the aircraft's flight management system, or may be provided by the Air Traffic Control body responsible for the airspace through which the aircraft is travelling. The flight path data represents discrete points along a predetermined path dictating the locations it is intended for the aircraft to travel through, along with a time schedule indicating the scheduled times at which the aircraft is intended to pass through each location. The flight path data is preferably in the form of a list of corresponding latitude, longitude, altitude, and time values. However, it is not necessary for the flight path data to specify a scheduled time value for every location, and therefore the list of time values may be optionally sparsely populated. Where necessary, the processor 200 can interpolate between data points to estimate intermediate values and thereby create the impression of continuous data. Alternatively, or in addition, the processor 200 may use the more sophisticated models of aircraft behaviour to predict intermediate points.

The location determination unit 220 is arranged to provide location data representing the aircraft's location in three dimensions, preferably in the form of latitude, longitude, altitude values. Suitable apparatus for determining the aircraft's location in three dimensions are well known in the art, and include: inertial navigation systems, GPS, radar, barometric altimeters, etc, or a combination of these.

The processor 200 is arranged to receive location data from the location determination unit 220 and flight path data from the flight path storage memory 210. The processor 200 thereby determines where along the predetermined flight path the aircraft is located at a given time. (If the aircraft's position deviates from the predetermined flight-path, the nearest location on the path can be used for the method discussed below).

The timer unit 230 is arranged to provide current time data representing the current time. The timer unit 230 may comprise a clock, or alternatively may determine the time by communicating with an external clock, e.g. GPS time.

The processor 200 is further arranged to receive current time data from the timer unit 230. The processor 200 compares the current time data with the scheduled time component of the flight path data and thereby determines a time deviation 110. The time deviation 110 thus represents the difference between the current time and the scheduled time stored in the flight path data corresponding to the current location of the aircraft along the predetermined flight path.

The display 100 displays the time deviation 110 determined by the processor 200. The display 100 can display the time deviation 110 by displaying the value as numeric characters and/or by displaying a graph. When displayed as a graph, the time deviation 110 can be represented on a linear scale or, as shown in FIG. 2, on a non-linear scale. Advantageously, the non-linear scale can display small values of time deviation 110 with greater accuracy than large values of time deviation 110.

During a flight, the flight crew can monitor the time deviation 110 to establish whether they are ahead of schedule or behind schedule for their current location. Thus they are able to make the necessary adjustments to the aircraft speed to reduce the time deviation 110 to thereby more closely follow the predetermined flight path. As will be appreciated, the flight crew can then influence airspeed accordingly and use the disclosed display to monitor the resulting change in ground speed. Airspeed may be modified by controlling the thrust provided by the aircraft's engines, or by adjusting the aircrafts control surfaces and configuration.

Figure 3:
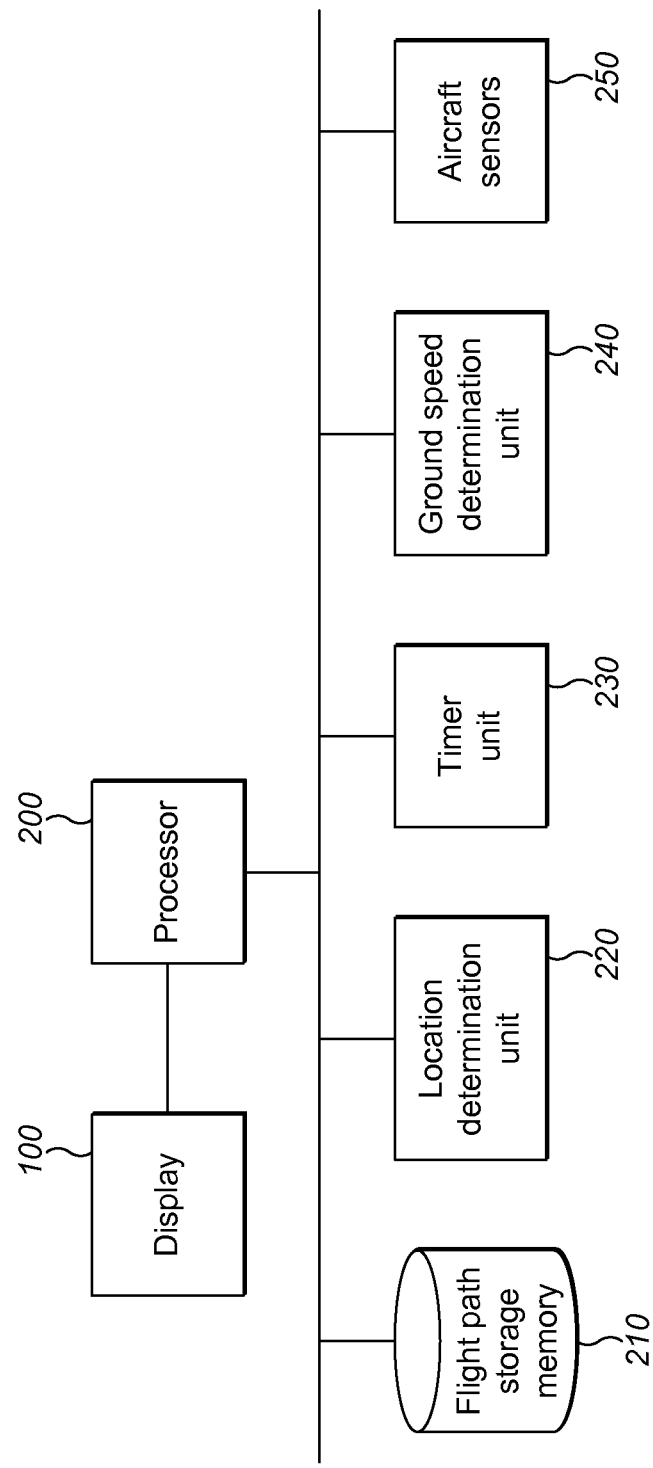
FIG. 3 shows schematic representation of a second embodiment of a system for displaying flight information.

In a second embodiment of the invention, as shown in FIG. 3, in addition to the components of the first embodiment, the aircraft comprises a ground speed determination unit 240. While the display of the first embodiment enables the flight crew to increase or decrease the aircraft speed to minimise the time deviation 110, when the predetermined four-dimensional flight path incorporates a variation in speed (for example, as the plane is taking off or landing), the time deviation 110 will increase or decrease accordingly. In order that the flight crew can more closely track the progress along the predetermined flight path, the display of the second embodiment also displays the deviation between the aircraft ground speed and a scheduled ground speed.

Figure 4:
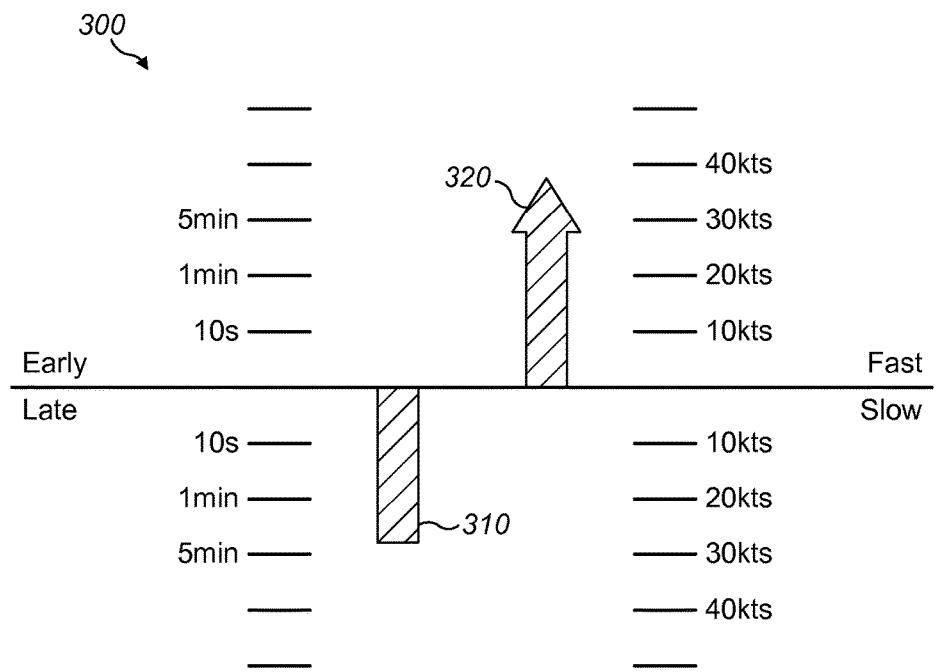
FIG. 4 shows a combined linear and non-linear display forming part of the second embodiment.

As depicted in FIG. 4, the display 300 shows a ground speed deviation 320, and may optionally also show one or more of: time deviation 310; a maximum permitted ground speed deviation 322; and a minimum permitted ground speed deviation 324 (it should be understood that the ground speed deviation can be a negative value—the minimum ground speed deviation therefore corresponds with the greatest permitted magnitude of deviation in the negative direction). Further optional quantities to display are: current ground speed; a maximum permitted ground speed; and a minimum permitted ground speed.

Any of the quantities can be displayed using a linear scale or non-linear scale. Indeed, as shown in FIG. 4, the time deviation 310 is displayed on a non-linear scale, while the ground speed deviation 320 is displayed on a linear scale.

In addition to the components recited above in the first embodiment, the flight path data of the second embodiment can include ground speed values indicating the scheduled ground speed at which the aircraft is intended to pass through each location along the predetermined flight path. Alternatively, the scheduled ground speed can be determined from the flight path data, for example by differentiation. The flight path data of the second embodiment is in the form of a list of corresponding latitude, longitude, altitude, time values, and ground speed values. Again, it is not necessary for the flight path data to specify a scheduled ground speed value for every location, and therefore the list of ground speed values may be sparsely populated.

The ground speed determination unit 240 is arranged to provide ground speed data representing the aircraft's ground speed. Alternatively, the aircraft's ground speed can be determined by the processor 200 by calculating the rate of change of ground location based upon the location determined by the location determination unit 220 and time from the timer 230.

The processor 200 is arranged to receive ground speed data from the ground speed determination unit 240 and flight path data from the flight path storage memory 210. The processor 200 compares the ground speed data with the scheduled ground speed component of the flight path data (or the scheduled groundspeed determined from the flight path data) and thereby determines a ground speed deviation 320. The ground speed deviation 320 thus represents the difference between the current ground speed and the scheduled ground speed stored in the flight path data corresponding to the current location of the aircraft along the predetermined flight path as determined by the processor 200.

The display 100 displays the time deviation 110 determined by the processor 200. The display 100 can display the ground speed deviation 320 by displaying the value as numeric characters and/or by displaying a graph. Preferably, the display 300 may show the aircraft's current ground speed, a maximum permitted ground speed and a minimum permitted ground speed.

During a flight, the flight crew can monitor the ground speed deviation 320 to establish whether they are progressing too quickly or too slowly in order to maintain a correct four-dimensional location. If the display 300 shows a time deviation 310 indicating that the aircraft is behind schedule, the flight crew can increase the aircraft thrust so that the ground speed deviation 320 indicates that the aircraft is moving faster than its scheduled speed. Thus, by increasing thrust such that the ground speed deviation 320 is positive, the time deviation 310 will begin to decrease. Conversely, by decreasing thrust such that the ground speed deviation 320 is negative, the time deviation 310 will begin to increase. In other words, by monitoring both the time deviation 310 and the ground speed deviation 320, the flight crew are able to make the necessary adjustments to the aircraft thrust, control surfaces or configuration to more closely follow the predetermined four-dimensional flight path.

As explained above, the display 300 may additionally display a maximum permitted ground speed and a minimum permitted ground speed. In such an embodiment, the aircraft comprises aircraft sensors 250 for measuring airspeed and heading. The aircraft sensor that measures airspeed is preferably a pitot tube. Preferably a temperature sensor is also provided to allow compensation for variation in air density using known methods. Reference to measured airspeed as used herein, can thus mean "true airspeed". The aircraft sensor that measures heading may be an electronic compass, a gyrocompass or a more complicated inertial navigation system.

Aircraft can vary in configuration, for example by movement of flaps or slats. For each configuration, an aircraft has an associated maximum airspeed that defines the greatest speed, relative to the body of air through which it is travelling, at which the aircraft can travel safely—for example, higher speeds may cause structural damage and/or result in adverse aerodynamic effects such as buffeting, or hinder the aircraft from manoeuvring effectively. The phrase maximum airspeed for the aircraft as used hereinafter means the maximum airspeed corresponding to the configuration of the aircraft at the relevant time. This quantity varies relative to ground speed in dependence upon wind speed and wind direction. For safety reasons, it is often preferred to define a maximum permitted airspeed as being less than the true maximum airspeed by a suitable safety factor. Maximum permitted ground speed 322 can be determined as the magnitude of the sum of the vector defining the aircraft's maximum permitted airspeed and the vector defining the wind speed. Wind speed and direction can be calculated in the conventional way, by comparing measured airspeed and heading (the orientation of the aircraft body) and measured ground speed and track (the direction in which the aircraft is moving). Track can be determined using the location data from the location determination unit 220.

As would be readily apparent to the skilled person, the determination of wind speed and direction is not an essential intermediate step in the calculation of maximum permitted ground speed, which can be determined directly from airspeed and heading, ground speed and track, and maximum permitted airspeeds. Indeed, maximum permitted ground speed can be calculated as the magnitude of the sum of the vector defining the aircraft's maximum permitted airspeed and the vector defining the ground speed minus the vector defining the airspeed. In preferred embodiments of the invention, maximum permitted ground speed will be shown on the display 300.

For each configuration, an aircraft will also have an associated minimum manoeuvring airspeed that defines the lowest speed, relative to the body of air through which the aircraft is travelling, at which the aircraft can manoeuvre safely without stalling. The phrase minimum manoeuvring airspeed for the aircraft as used hereinafter means the minimum manoeuvring airspeed corresponding to the configuration of the aircraft at the relevant time. The ground speed associated with the minimum manoeuvring airspeed for each configuration will vary in dependence upon wind speed and wind direction. For safety reasons, it is often preferred to define a minimum permitted airspeed as being higher than the true minimum manoeuvring airspeed by a suitable safety factor. Minimum permitted ground speed can be determined as the magnitude of the sum of the vector defining the aircraft's minimum permitted manoeuvring airspeed and the vector defining the wind speed.

As stated above, the determination of wind speed and direction is not an essential intermediate step in the calculation of minimum permitted ground speed, which can be determined directly from airspeed and heading, ground speed and track, and minimum permitted airspeeds. For example, minimum permitted ground speed can be calculated as the magnitude of the sum of the vector defining the aircraft's minimum permitted airspeed and the vector defining ground speed minus the vector defining the airspeed. In preferred embodiments of the invention, minimum permitted ground speed for the aircraft's present configuration will be shown on the display 300.

In further preferred embodiments, the maximum permitted ground speed deviation 322 and minimum permitted ground speed deviation 324 can be displayed. That is, the quantities of maximum permitted ground speed and minimum permitted ground speed can be displayed as relative values, relative to current ground speed. Thereby upper and lower bounds for the ground speed deviation 320 can be indicated. During a flight, the flight crew can thereby compare the ground speed deviation 320 with the maximum and minimum permitted ground speed deviations 322, 324, to ensure that the aircraft is operated within safe limits.

As discussed above, a deviation from scheduled ground speed may be displayed. Some flight management systems (or Air Traffic Control) may generate commands when an aircraft is ahead or behind schedule in order to "capture" a certain desired position along a track. The commands may be in the form of a desired ground speed. In preferred embodiments, the command may be a desired ground speed that will enable the aircraft to reach a desired position along the track at the time scheduled for that location. In this way, the flight management system (or Air Traffic Control) can instruct the aircraft to "catch up" with the scheduled track within a desired time period, or by the time the aircraft reaches a desired location. The system can determine the deviation between the current ground speed and the commanded ground speed in order to calculate a commanded ground speed deviation. In preferred embodiments the commanded ground speed deviation may be displayed instead of, or in addition to, the ground speed deviation 320 calculated by comparing current and scheduled ground speeds.

Figure 5:
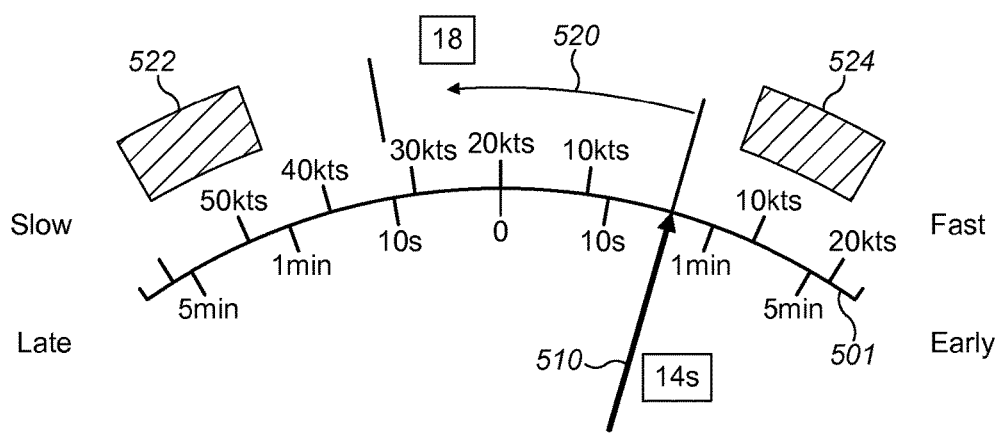
FIG. 5 shows an alternative layout for presenting flight information on a combined linear and non-linear display forming an embodiment of the invention.

FIG. 5 depicts a layout for presenting flight information to a flight crew. As can be seen in FIG. 5, the display is presented on an axis arranged as a sector 501 of a circle rather than in the straight-line form shown in FIGS. 2 and 4. Divisions are provided below the sector 501 to graphically represent discrete values of time deviation along a continuous axis. Divisions are provided above the sector 501 to graphically represent discrete values of ground speed deviation along a continuous axis.

The time deviation 510 and/or the ground speed deviation 520 can be represented on a linear or on a non-linear scale. Advantageously, the non-linear scale can display small values of the time deviation 510 and/or the ground speed deviation 520 with greater accuracy than large values. In the preferred embodiment of FIG. 5, the time deviation 510 is displayed on a non-linear scale, while the ground speed deviation 520 is displayed on a linear scale.

As shown in FIG. 5, the ground speed deviation 520 (and optionally the maximum permitted ground speed deviation 522 and the minimum permitted ground speed deviation 524) is depicted on a scale that moves with the displayed value of time deviation 510. In other words, the origin of the ground speed deviation axis corresponds to the arrow depicting the time deviation. In this way, the display can represent the ground speed deviation in a manner such that its influence on the valuation of time deviation can be easily understood; if it extends to the left this indicates the time deviation arrow will move to the left, whereas if it extends to the right this indicates the time deviation arrow will move to the right. Such a moving origin display can also be used with the linear form of layout shown in FIGS. 2 and 4.

Accordingly, a preferred embodiment of a layout for presenting flight information comprises:

a time deviation scale having an origin and portions extending either side of the origin to represent positive and negative values of time deviation;

a time deviation indicator to indicate a point along the time deviation scale to thereby indicate a value of time deviation;

a ground speed deviation scale having an origin and portions extending either side of the origin to represent positive and negative values of ground speed deviation; and a ground speed deviation indicator to indicate a point along the ground speed deviation scale to thereby indicate a value of ground speed deviation, wherein:

the origin of the ground speed deviation scale varies with the indicated value of time deviation.

Optionally, the layout may also comprise a maximum permitted ground speed deviation indicator to indicate a point along the ground speed deviation scale to thereby indicate a maximum permitted value of ground speed deviation.

Optionally, the layout may also comprise a minimum permitted ground speed deviation indicator to indicate a point along the ground speed deviation scale to thereby indicate a minimum permitted value of ground speed deviation.

Further preferred embodiments may include a ground speed indicator to indicate the current ground speed. Such an indicator could be provided with a separate ground speed scale, or could indicate a location along the ground speed deviation scale, since this represents the appropriate units and could therefore also be considered a ground speed scale.

Optionally, the layout may also comprise a maximum permitted ground speed indicator to indicate a point along the ground speed scale to thereby indicate a maximum permitted value of ground speed.

Optionally, the layout may also comprise a minimum permitted ground speed indicator to indicate a point along the ground speed scale to thereby indicate a minimum permitted value of ground speed.

In the Figures and the text, a method is disclosed of displaying flight information relating to a predetermined flight path that specifies locations and scheduled times corresponding thereto, the method comprising the steps of:

monitoring a current location of an aircraft along the predetermined flight path; determining a current time at which the aircraft is at the current location; providing a scheduled time for the aircraft to be at the current location; calculating a time deviation 110, 310 between the current time and the scheduled time; and displaying the time deviation 110, 310. In one variant, the method includes the step of providing a desired ground speed for the aircraft at the current location. In another variant, the method includes wherein the desired ground speed is a scheduled ground speed. In still another variant, the method in includes the steps of: monitoring a current ground speed of the aircraft; calculating a ground speed deviation 320 between the current ground speed and the desired ground speed; and displaying the ground speed deviation 320. In yet another variant, the method includes further the step of displaying the desired ground speed.

In one alternative, the method further includes the steps of: monitoring the aircraft's current ground speed, current airspeed, current heading, and current track; defining a maximum operating airspeed for the aircraft; calculating a maximum permissible ground speed deviation 322 based upon the defined maximum operating speed, the current airspeed, the current ground speed, the current heading, and the current track; and displaying the maximum permissible ground speed deviation 322. In yet another alternative, the method further includes the steps of: defining a minimum operating airspeed for the aircraft; calculating a minimum permissible ground speed deviation 324 based upon the defined minimum manoeuvring airspeed, the current airspeed, the current ground speed, the current heading, and the current track; and displaying the minimum permissible ground speed deviation 324.

In one aspect, a system is disclosed for displaying flight information including a flight path storage memory 210 arranged to store data relating to a predetermined flight path that specifies locations along the flight path and scheduled times corresponding thereto; a location determination unit 220 arranged to output location data defining a current location of an aircraft along the predetermined flight path; a timer unit 230 arranged to output time data defining a current time at which the aircraft is at the current location; a processor 200 arranged to receive the location data and the time data, to determine a scheduled time from the scheduled times stored in the flight path memory corresponding to the current location, and to calculate a time deviation 110, 310 between the current time and the scheduled time; and a display 100 arranged to display the time deviation 110, 310.

In one variant, wherein the system disclosed is arranged to provide a desired ground speed. In yet another variant, the system includes wherein: the flight path storage memory 210 is arranged to store scheduled ground speeds corresponding to the specified locations along the flight path; and the desired ground speed is a scheduled ground speed corresponding to the current location. In yet another variant, wherein the processor 200 is further arranged to calculate scheduled ground speeds corresponding to the specified locations along the flight path, based upon the specified locations along the flight path and the scheduled times corresponding thereto; and the desired ground speed is a scheduled ground speed corresponding to the current location.

In one alternative, the system is disclosed further including a ground speed determination unit 240 arranged to output ground speed data defining a measured current ground speed of the aircraft, wherein: the processor 200 is further arranged to receive the ground speed data and to calculate a ground speed deviation 320 between the measured current ground speed and the desired ground speed corresponding to the current location; and the display 100 is further arranged to display the ground speed deviation. In one variant, the system is disclosed wherein the display (100) is further arranged to display the scheduled ground speed. In yet another variant, the system is disclosed including a ground speed determination unit 240 arranged to output ground speed data defining a measured current ground speed of the aircraft, and track data defining a measured track of the aircraft; and aircraft sensors 250 arranged to output airspeed data defining a measured current airspeed of the aircraft, and heading data defining a measured current airspeed of the aircraft, wherein: the aircraft has a defined maximum operating airspeed; the processor 200 is further arranged to receive the airspeed data from the airspeed sensor, the ground speed data and the track data from the ground speed determination unit 240, and the heading data from the heading sensor; the processor 200 is further arranged to calculate a maximum permissible ground speed deviation 324 based upon the defined maximum operating airspeed, the airspeed data, the ground speed data, the heading data, and the track data; and the display 100 is further arranged to display the maximum permissible ground speed deviation 324.

In one variant, the system is disclosed wherein: the aircraft has a defined minimum manoeuvring airspeed; the processor 200 is further arranged to calculate a minimum permissible ground speed deviation 320 based upon the defined minimum manoeuvring airspeed, the airspeed data, the ground speed data, the heading data, and the track data; and the display 100 is further arranged to display the minimum permissible ground speed deviation 320.

What is claimed is:

1. A method of displaying flight information relating to a predetermined flight path that specifies locations and scheduled times corresponding thereto, the method comprising the steps of:
    monitoring a current location of an aircraft along the predetermined flight path;
    determining a current time at which the aircraft is at the current location;
    providing a scheduled time for the aircraft to be at the current location;
    calculating, by a processor, a time deviation between the current time and the scheduled time; and
    displaying the time deviation on a time deviation scale, the time deviation scale comprising divisions that represent discrete values of time for early and late time deviations of the current time from the scheduled time for the current location, a corresponding time value being displayed in association with each respective division; and
    controlling at least one of a thrust of an engine of the aircraft or a configuration of the aircraft in response to the time deviation on the time deviation scale.

2. The method of claim 1, further comprising the step of providing a desired ground speed for the aircraft at the current location.

3. The method in accordance with claim 2, wherein the desired ground speed is a scheduled ground speed.

4. The method in accordance with claim 2, further comprising the steps of:
    monitoring a current ground speed of the aircraft;
    calculating a ground speed deviation between the current ground speed and the desired ground speed; and
    displaying the ground speed deviation on a ground speed deviation scale, the ground speed deviation scale comprising divisions that represent discrete values of ground speed deviation for slower and faster ground speed deviations of the current ground speed from the desired ground speed, a corresponding ground speed deviation value being displayed in association with each respective division.

5. The method in accordance with claim 2, further comprising the step of displaying the desired ground speed.

6. The method in accordance with claim 5, further comprising the steps of:
    monitoring the aircraft's current ground speed data, current airspeed data, current heading data, and current track data;
    defining a maximum operating airspeed for the aircraft;
    calculating a maximum permissible ground speed deviation based upon the defined maximum operating airspeed, the current airspeed data, the current ground speed data, the current heading data, and the current track data; and displaying the maximum permissible ground speed deviation.

7. The method in accordance with claim 6, further comprising the steps of:
defining a minimum operating airspeed for the aircraft;
calculating a minimum permissible ground speed deviation based upon the defined minimum operating airspeed, the current airspeed data, the current ground speed data, the current heading data, and the current track data; and
displaying the minimum permissible ground speed deviation.

8. A system for displaying flight information comprising:
a flight path storage memory arranged to store data relating to a predetermined flight path that includes specified locations along the flight path and scheduled times corresponding thereto;
a location determination unit arranged to output location data defining a current location of an aircraft along the predetermined flight path;
a timer unit arranged to output time data defining a current time at which the aircraft is at the current location;
a processor arranged to receive the location data and the time data, to determine a scheduled time from the scheduled times stored in the flight path memory corresponding to the current location, and to calculate a time deviation between the current time and the scheduled time; and
a display arranged to display the time deviation on a time deviation scale, the time deviation scale comprising divisions that represent discrete values of time for early and late time deviations of the current time from the scheduled time for the current location, a corresponding time value being displayed in association with each respective division, wherein at least one of a thrust of an engine of the aircraft or a configuration of the aircraft is controlled in response to the time deviation on the time deviation scale.

9. The system in accordance with claim 8, wherein the system is arranged to provide a desired ground speed.

10. The system in accordance with claim 9, wherein:
the flight path storage memory is arranged to store scheduled ground speeds corresponding to the specified locations along the flight path; and
the desired ground speed is a scheduled ground speed corresponding to the current location.

11. The system in accordance with claim 9, wherein:
the processor is further arranged to calculate scheduled ground speeds corresponding to the specified locations along the flight path, based upon the specified locations along the flight path and the scheduled times corresponding thereto; and
the desired ground speed is a scheduled ground speed corresponding to the current location.

12. The system in accordance with claim 11, further comprising a ground speed determination unit arranged to output ground speed data defining a measured current ground speed of the aircraft, wherein:
the processor is further arranged to receive the ground speed data and to calculate a ground speed deviation between the measured current ground speed and the desired ground speed corresponding to the current location; and
the display is further arranged to display the ground speed deviation on a ground speed deviation scale, the ground speed deviation scale comprising divisions that represent discrete values of ground speed deviation for slower and faster ground speed deviations of the current ground speed from the desired ground speed, a corresponding ground speed deviation value being displayed in association with each respective division.

13. The system in accordance with claim 12, wherein the display is further arranged to display the scheduled ground speed.

14. The system in accordance with claim 9, further comprising:
a ground speed determination unit arranged to output ground speed data defining a measured current ground speed of the aircraft, and track data defining a measured track of the aircraft; and
aircraft sensors comprising an airspeed sensor and a heading sensor, the airspeed sensor being arranged to output airspeed data defining a measured current airspeed of the aircraft, and the heading sensor being arranged to output heading data defining a current heading of the aircraft, wherein:
the aircraft has a defined maximum operating airspeed;
the processor is further arranged to receive the airspeed data from the airspeed sensor, the ground speed data and the track data from the ground speed determination unit, and the heading data from the heading sensor;
the processor is further arranged to calculate a maximum permissible ground speed deviation based upon the defined maximum operating airspeed, the airspeed data, the ground speed data, the heading data, and the track data; and
the display is further arranged to display the maximum permissible ground speed deviation.

15. The system in accordance with claim 14, wherein:
the aircraft has a defined minimum operating airspeed;
the processor is further arranged to calculate a minimum permissible ground speed deviation based upon the defined minimum operating airspeed, the airspeed data, the ground speed data, the heading data, and the track data; and
the display is further arranged to display the minimum permissible ground speed deviation.

16. The method of claim 4, wherein displaying the time deviation and the ground speed deviation comprises displaying the time deviation scale and the ground speed deviation scale together in a straight-line form.

17. The method of claim 4, wherein displaying the time deviation and the ground speed deviation comprises displaying the time deviation scale and the ground speed deviation scale arranged as a sector of a circle.

18. The method of claim 17, further comprising displaying the time deviation on one side of the sector of the circle and displaying the ground speed deviation on an opposite side of the sector of the circle.

19. The method of claim 18, wherein the time deviation scale comprises a non-linear scale and the ground speed deviation scale comprises a linear scale.

20. The method of claim 18, further comprising moving an origin of the ground speed deviation scale with an indicator of the time deviation, the origin of the ground speed deviation scale corresponding to the indicator of the time deviation.

21. The method of claim 4, further comprising displaying the time deviation and the ground speed deviation in association with one another.

22. The method of claim 1, wherein the time deviation scale further comprises:
a first portion comprising a plurality of late time deviations; and a second portion comprising a plurality of early time deviations.

\* \* \* \* \*